United States Patent
Plate et al.

(10) Patent No.: US 7,210,657 B2
(45) Date of Patent: May 1, 2007

(54) CLAMP HOLDER FOR A SUPPORT STRUCTURE

(75) Inventors: Hans-Georg Plate, Roseburg (DE); Lutz Schapke, Hamburg (DE); Doris Zyrull, Neu Wulmstorf (DE)

(73) Assignee: Airbus Deutschland GmbH (DE)

( * ) Notice: Subject to any disclaimer, the term of this patent is extended or adjusted under 35 U.S.C. 154(b) by 89 days.

(21) Appl. No.: 11/118,694

(22) Filed: Apr. 29, 2005

(65) Prior Publication Data

US 2006/0113442 A1    Jun. 1, 2006

Related U.S. Application Data

(60) Provisional application No. 60/600,064, filed on Aug. 9, 2004.

(30) Foreign Application Priority Data

Apr. 30, 2004    (DE)    ........................ 10 2004 021 513

(51) Int. Cl.
  *F16L 3/24* (2006.01)
(52) U.S. Cl. .................. 248/72; 248/228.1; 248/228.2; 248/231.9; 248/243
(58) Field of Classification Search .................. 248/72, 248/228.1, 228.2, 231.9, 243, 245, 317; 52/506.07, 52/220.6, 699, 702, 647, 733.1
  See application file for complete search history.

(56) References Cited

U.S. PATENT DOCUMENTS 1,662,539 A * 3/1928 Schmidt ...................... 104/111
1,830,438 A * 11/1931 Miller .......................... 248/73

(Continued)

FOREIGN PATENT DOCUMENTS

DE    197 43 976    5/1998

(Continued)

*Primary Examiner*—Carl Friedman
*Assistant Examiner*—Michael McDuffie
(74) *Attorney, Agent, or Firm*—Ostrolenk, Faber, Gerb & Soffen, LLP

(57) ABSTRACT

A clamp holder to be suspended in an opening of vertical. The clamp holder includes a cantilever beam, a pillar, and a clamp slider. The cantilever beam is vertically at the beam end on an upper end of the pillar, on the back of the pillar. A beam extension is angled upward from the beam on the front of the pillar. A clamp slider, in a U-shape is on a free leg end vertically at a lower end of the pillar. A beam-like holding element is molded onto a free end of the beam extension. A cuboid support element is molded onto the free end of the holding element, with a cuboid transverse surface of the holding element placed in front of the pillar, and is angled upward from the support element molding. The support element has a mutual relationship with a cuboid pressure element. The latter is positioned removably attached to the support element. The pressure element has a receiver region with a chamber open to the base and the cover faces of the pressure element. The open chamber cross-section is tailored to the element cross-section and the spatial position of the support element, and because of that, an internal chamber wall region of the chamber, if the support element is guided through the chamber, is fixed in place on the support element by correlation of multiple mechanical means.

17 Claims, 1 Drawing Sheet

U.S. PATENT DOCUMENTS

| | | | | |
|---|---|---|---|---|
| 2,615,666 A * | 10/1952 | Jones | | 248/243 |
| 2,678,786 A * | 5/1954 | Kindorf | | 248/72 |
| 3,445,081 A * | 5/1969 | Roussos | | 248/72 |
| 3,954,247 A * | 5/1976 | Krusche | | 248/471 |
| 4,013,253 A * | 3/1977 | Perrault et al. | | 248/222.51 |
| 4,124,962 A * | 11/1978 | Lancelot et al. | | 52/702 |
| 4,151,917 A * | 5/1979 | Pugh | | 211/88.01 |
| 4,646,647 A * | 3/1987 | Spoler et al. | | 104/111 |
| 4,665,672 A * | 5/1987 | Commins et al. | | 52/295 |
| 4,739,602 A * | 4/1988 | Fricker | | 52/702 |
| 4,744,191 A * | 5/1988 | Fricker | | 52/702 |
| 4,759,654 A * | 7/1988 | Martin et al. | | 403/387 |
| 4,802,786 A * | 2/1989 | Yauger et al. | | 403/232.1 |
| 4,825,621 A * | 5/1989 | Jensen | | 52/702 |
| 4,920,725 A * | 5/1990 | Gore | | 52/702 |
| 5,092,546 A * | 3/1992 | Wolfbauer | | 248/49 |
| 5,316,244 A * | 5/1994 | Zetena, Jr. | | 248/49 |
| 5,549,049 A * | 8/1996 | Deandrea | | 104/111 |
| 5,560,575 A * | 10/1996 | Krysiak | | 248/222.12 |
| 5,765,902 A * | 6/1998 | Love | | 296/100.01 |
| 5,788,192 A * | 8/1998 | Poole, Jr. | | 248/49 |
| 5,797,573 A * | 8/1998 | Nasu | | 248/231.31 |
| 5,868,263 A * | 2/1999 | McAllister et al. | | 211/90.01 |
| 5,941,485 A * | 8/1999 | Davidson et al. | | 248/218.4 |
| 6,086,032 A * | 7/2000 | van Leeuwen | | 248/228.1 |
| 6,378,822 B1 * | 4/2002 | Franks | | 248/218.4 |
| 6,484,982 B1 * | 11/2002 | Barry et al. | | 248/218.4 |
| 6,491,272 B1 * | 12/2002 | Franks | | 248/218.4 |
| 6,557,807 B1 * | 5/2003 | Belanger | | 248/215 |
| 6,565,048 B1 * | 5/2003 | Meyer | | 248/58 |
| 6,631,874 B2 * | 10/2003 | Turpin et al. | | 248/49 |
| 2003/0070377 A1 | 4/2003 | Waalkes et al. | | 52/481.2 |

FOREIGN PATENT DOCUMENTS

| | | |
|---|---|---|
| DE | 197 43 976 A1 | 5/1998 |
| GB | 2 276 912 A | 3/1994 |

* cited by examiner

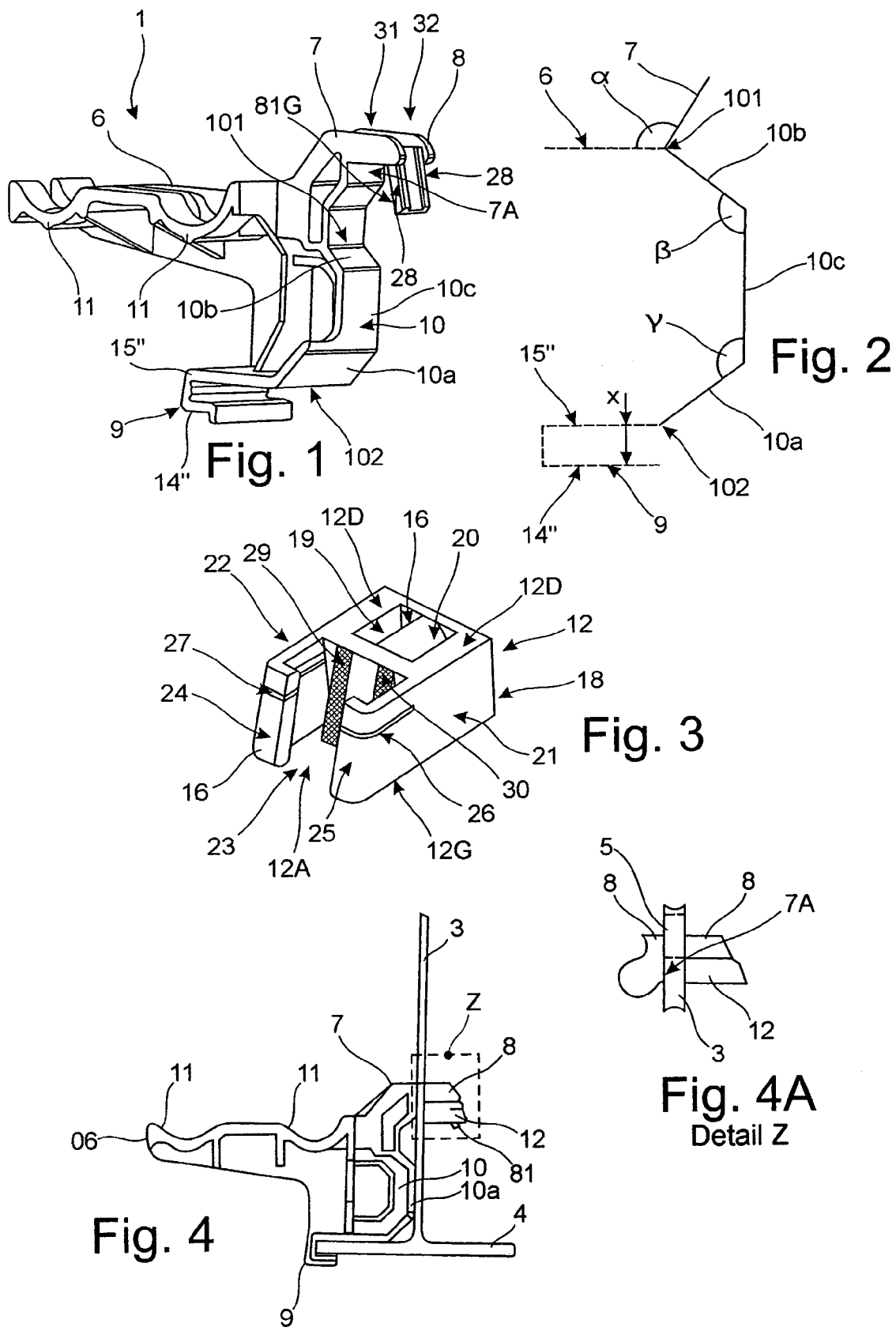

CLAMP HOLDER FOR A SUPPORT STRUCTURE

The present invention relates to a clamp holder for a support structure The clamp holder, which is intended to be suspended in an opening left out of an approximately vertically standing structure part, such as the web of an I-beam of an aircraft structure, is used with a holder-integrated cantilever beam for beam-mounted support of pipes or cables or cable bundles in the aircraft, an attachment of the clamp holder to the aircraft structure being implemented which is not impaired in any way by unintentional detachment of the clamp holder as a result of jolts, vibrations, or other expected mechanical influences to which it is subjected during flight (operation). The clamp holder is primarily attached to aircraft fuselage transverse beams, seat rails, or seat rail beams, in order to provide a suitable support for internally laid aircraft line connections.

In general, multiple different clamp holders are known to those skilled in the art, which are used, for example, in vehicle construction and (thus also) in aircraft construction in the implementation of line installations over longer line paths. These clamp holders predominantly comprise plastics for reasons of influencing the weight of an aircraft. Plastic holders of this type are subject, however, to the disadvantage that with increasing attachment time, because of the mechanical effects on the holder (specified at the beginning), holder slipping or even loosened holder-structure attachment may not be prevented in most cases, and the plastics display certain flow effects after long use, which may result in detached holder-structure attachment in the event of continuous mechanical long-term effects.

It is also known that in aircraft of the type "Airbus", for example, holders are also considered for line installation which are positioned (suspended) on a support structure of the aircraft within a circular opening (hole), which is left open on the plate web of a T-shaped beam, and attached to the web. For static reasons, there is a need to flatly thicken and/or mechanically reinforce these separately introduced holes around the circumference of the hole, due to which an (undesired) weight increase may not be prevented. Corresponding problems therefore also arise with this thickening in the structure attachment of traditionally used suspended clamp holders, which, with a tilted attachment of the holder body to the plate-like web element of the T-shaped beam of the aircraft structure, provoke improperly performed installation of the suspended clamp holder. A material equalization of the affected contact region between the non-thickened contact area of the web element and the body contact area of the suspended clamp holder provided for structure contact appears unavoidable for proper attachment of the holder to the structure. However, traditionally used suspended holders also do not have the capability of compensating for thickness differences of the type described.

In addition, the danger always exists that in the event of improperly performed attachment of the suspended holder to the web element, the beam observed will be subject to a constant danger of loosening. The reasons for this have already been noted. Therefore, in the event of a loosening attachment of the suspended holder, tipping (vertical lowering) of the suspended holder, which is suspended, for example, in a circular opening (a hole) of the aircraft structure having a very large diameter and is attached at the edge of the hole (in the region of a lower part of the hole circumference) to the aircraft structure (which is also thickened around the circumference of the hole), may be predicted, whose origin may be attributed to a weight load of the holder-integrated cantilever beam.

Furthermore, a holder device is disclosed by the publication DE 197 43 976 A1, which is to be attached to the wall. The construction of this holder device therefore considers a profiled part which has at least one horizontally projecting leg on its side facing toward the wall, which is used for suspension in a wall recess or in an associated adapter. The problem in this case is ensuring the anti-twist lock, for which the wall must be provided with additional holes or additional contact faces are necessary. A corresponding screw connection may also be used, which again has the disadvantages already described, however, since typically an additional hole is necessary for the screw.

In addition, an achievement of the object for a clamp holder is known from the publication GB 2 276 912 A, whose construction differs from that of the clamp holder described below, although it is somewhat similar. This clamp holder is specified having a lateral wing, which is mechanically connected to a web element that has a flange molded on one side and one end. Furthermore, a downwardly directed lip element is molded on to this flange on the (non-molded) free flange end, which forms a hook element together with the flange (depending on the shape).

This achievement of the object for a clamp holder considers that the hook element thus produced will be hooked on the long edge side on an additional (plate-like or strip-like) beam element (rail member). The edge region of a support flange (not integrated on the clamp holder) (first flange element), on which a plate-like support element (second web element) is molded on vertically, is laid on the flange of this first hook element (of the clamp holder) (molded onto the web), this flange and beam element forming a T-shaped beam. In addition, the non-molded end of the plate-like support element (second web element) is angled approximately perpendicularly with a support strip which is laid on the side of the edge region, resting on the flange, which is parallel to the first hook element. The non-hooked end of the additional beam element is supported on this support strip.

The arrangement having this clamp holder is thus completed in that laterally of the cited web element of this observed clamp holder, which is mechanically (detachably) connected to the cited lateral wing, a vertical tooth rack is positioned, in which the (toothed) inner side of a vertically (along the tooth rack) changeable pawl element engages on one side and locally step-by-step (by tooth). An upwardly directed second hook element is placed on the front of this pawl element, this support strip (of the support element plate molded onto the support flange together with the supported (non-hooked end)) of the additional beam element being positioned on this hook element (within the hook shape). With the aid of the tooth-positioned locking element, the additional beam element, which the support flange will press along the edge against the hook element (formed by the flange and the lip), is thus mechanically fixed neighboring the web element of the clamp holder.

This described clamp holder is fixed very complexly to a support structure, if one compares this T-shaped beam, which is formed by a support flange (first flange element) and a plate-like support element (second web element), to a support structure. It may not be doubted, however, that this first hook element of this clamp holder, which is molded onto the end of this web element, may be suspended in a circular opening that is left open in a structure. However, a clamp holder suspended in this way will hardly be capable of implementing a slip-proof and twist-proof attachment to an edge region proximal to the opening without special precautions.

Therefore, the present invention is based on the object of improving a clamp holder according to the species, which is intended for suspension in an opening that is left out in a support structure, in such a way that a stable and twist-proof attachment to a web of the support structure of an aircraft may be performed by it without special effort.

The present invention will be described in greater detail in an exemplary embodiment on the basis of the attached drawing.

FIG. 1 shows a 3-D view of the clamp holder for a support structure

FIG. 2 shows a line illustration of the elements integrated into the clamp holder in FIG. 1 (with an element position correlated to the side view of the clamp holder), FIG. 3 shows a 3-D view of a pressure element integrated into the clamp holder, FIG. 4 shows a side view of a clamp holder suspended in an opening of the support structure and attached to the support structure in the final state, FIG. 4A shows the detail Z in FIG. 4 with an illustration of the clamp holder suspended in the opening.

The clamp holder 1 for a support structure, which is shown in a three-dimensional illustration in FIG. 1, is used as a suspended clamp holder, since it is used for suspension in a circular recess 5, referred to as an opening, which is left out in a web element 3 of the support structure, and its attachment to an edge region of the web element 3, which borders the recess 5 (opening) except for a circular section. The attached final state of the clamp holder 1 may be inferred by viewing FIGS. 4 and 4A.

The support structure which is referred to often in the following relates to a T-shaped beam, which is frequently integrated with an I-beam of the observed aircraft structure, for example. In this case, a web element 3 is observed, which is positioned above a lower flange element 4, on which the web element 3 stands vertically. A circular recess 5 is left out of this plate-shaped web element 3, the flange element and the lower beam element 3, 4 being integrated with a support structure implemented by a T-beam or I-beam 2.

The construction of the clamp holder 1 (suspended clamp holder) comprises a cantilever beam 6, a pillar 10 and a U-shaped clamp slider 9, which are assembled into a holder body in profile construction using rolled profiles or sheet metal. FIG. 2 shows that a straight pillar region 10c of the pillar 10 on an upper end 101 of an upper pillar edge region 10b of the pillar 10, which is angled upward at the acute angle β on the left of the linear pillar region 10c, is molded onto the cantilever beam 6 with a beam extension 7, that is angled upward from the cantilever beam 6 at the acute angle α on the right side of the beam molding. Furthermore, the construction considers that a lower end 102 of the pillar 10 is assigned to a lower support edge region 10a, which is angled downward at the acute angle γ on the left of the linear pillar region 10c.

In addition, a clamp slider 9 is observed, which is equipped with an upper and a lower leg element 14", 15", which are positioned in parallel at distance x. The upper leg element 15" is molded onto the free leg end of the lower end 102 of the pillar 10. In this case, the clamp slider 9 is capable of being pushed onto the lower flange element 4 with the open cross-section which both leg element 14", 15" delimit at distance x, the linear pillar region 10c pressing against the web element 3 below the recess 5 in the pushed-on state.

All of these cited support body elements may be found in FIG. 1. It is also to be noted that half-shell-like openings 11 are also specified in FIG. 1, which are molded above this cantilever beam 6. These openings 11 are used for resting the installed cable, lines, or pipes, which will not be discussed in greater detail, however, because of a lack of reference to the object initially specified and primarily to be achieved.

Returning to FIG. 1, it is further noted that a beam-like holding element 8 is molded onto the free end of the beam extension 7 on one side and one end. It is intended that the position of the holding element 8 approximately correspond to that of the cantilever beam 6, if a further support face 7A, positioned below the holding element 8 and also assigned to the beam extension 7, and the linear pillar region 10c of the pillar 10 rest on the back of the web element 3 below the circular recess 5 (opening). The further support face 10A is positioned on the clamp holder 1 in such a way that its flat surface course and surface position correspond to that of the linear pillar region 10c of the pillar 10. Furthermore, a cuboid support element 81 is molded onto the free end of the holding element 8, which is angled off of the holding element 8 at the ends of the cuboid long edges with a cuboid transverse surface (and/or with the smaller cuboid lateral surface). In this case, this support element 81 is angled downward from the support element molding on the front side of the pillar (front side of the plate surface) of the web element 3, if the further support face 10A of the pillar 10 and the cited further support face 7A of the beam extension 7 rest against the back of the web element and the holding element 8 is guided through the circular recess.

The support element 81 which is illustrated in FIG. 4 has a mutual relationship with a cuboid pressure element 12 shown in FIG. 2, because the element 12 is positioned removably attached to the support element 81. The pressure element 12 is implemented having a first and second receiver region 16, 17. The first receiver region 16 is provided to receive a cable tie and the second receiver region 17 is provided to receive this support element 81. This second receiver region 17 is equipped with a chamber 12A, whose chamber space is open toward the base and cover faces 12G, 12D of the (cuboid) pressure element 12. The chamber space has an open chamber cross-section, which is tailored as much as possible to the element cross-section in the spatial position of the support element 81, because of which an interior wall region 13 of the chamber 12A, if the support element 81 is guided through the chamber 12A, is fixed in place on the support element 81 through the correlation of multiple mechanical means which are considered in these two connection elements (which are movable in relation to one another).

The external surface of a rear lateral face 18 of the pressure element 12 is designed as planar (flat), because this lateral face 18, if the pressure element 12 is pushed onto the support element 81, may rest against the front planar elemental face of the web element 3 in the pushed-on final state. Therefore, this rear lateral face 18 of the pressure element 12 is tailored to the vertical position of the web element (3) of the support structure. Two slotted recesses 19, 20 for receiving (one strip-like cable tie band each) are left out from the first receiver region 16 of the pressure element 12, each of which are beveled outward from the cover face 12D to the base face 12G of the pressure element 12 and to one of the neighboring lateral faces 21, 22 lying at a right angle to the rear lateral face 18.

According to the example, the pressure element 12 is implemented having a front lateral face. A rectangular lateral face partial region 23 is preferably left out of this front lateral face, milled out, for example, using which an opening of the front lateral face is implemented from the base face 12G to the cover face 12D. The chamber 12A is thus open on the front of the pressure element 12. The front lateral surface partial regions 24, 25 remain of the front lateral surface, which are not (also) left out and each adjoin the edge of the neighboring lateral faces 21, 22 at a right angle. The latter are preferably implemented as beveled downward from the cover face to the base face of the pressure element 12, whose position approximately corresponds to the angle of the support element 81.

A slot 26, 27, which is positioned running parallel to (and below) the cover face (12D) or (above) the base face 12G of the pressure element 12, is left out (beginning at the front of the pressure element 12) of each of these neighboring lateral faces 21, 22 and (according to the example) the remaining lateral face partial regions 24, 25.

Multiple nubby or cylindrical protrusions 28 are positioned on the two cuboid long faces of the cuboid support element 81, whose cross-section is tailored to the slot width of the relevant slot 26, 27. These protrusions are positioned at a distance to one another at approximately half the cuboid height or around the edge and parallel to the cuboid long edges. The distance of these protrusions 28 is to be selected in such a way that it is ensured the individual protrusion 28 engages in the slot 26, 27.

Multiple ridges 29, 30 are positioned parallel to one another on the back of the chamber 12A of the pressure element 12 on the internal chamber wall region 13, of which two ridges 29, 30 will be considered as examples. These ridges 29, 30 lead up to the base and cover faces 12G, 12D of the pressure element 12 and are positioned at a distance to one another. The ridge surface of these ridges 29, 30 (attached to the internal chamber wall region 13) which faces toward the chamber cross-section is to be implemented as rough or rippled (for reasons explained following).

The base face 81G of the support element 81 is also to be equipped with multiple parallel flat strips or strip-like flat regions which are implemented as roughened or rippled, which run along or parallel to the cuboid long edges and are positioned at a distance to one another.

It is intended that the rough or rippled strip surfaces of the pressure element 12 and the similarly implemented flat strips or the strip-like flat regions of the support element 81 mechanically correlate with one another if the support element 81 is guided through the chamber 12 A or the pressure element 12 is pushed onto the support element 81.

The pressure element 12 is conceived in such a way that while the support element 81 is guided through the chamber 12A of the pressure element 12 and/or the latter is pushed onto the support element 81, the flat strips or the strip-like flat regions are (lightly) pressed against those strip surfaces of the two strips 29, 30, so that their roughened or rippled surfaces rubbing on one another will engage. Therefore, because of the element surfaces rubbing on one another, at least one slip and/or a detachable attachment of the pressure element 12 to the support element 81 may be implemented.

In addition, two further slotted recesses 31, 32 are left out of an element section near the free end of the holding element 8, which may be adequately received by the cited slotted recesses 19, 20 of the pressure element 12. These slotted recesses 31, 32 are left out in such a way that a cable tie (band) may be guided without problems through these slotted recesses 19, 20 of the pressure element 12 and/or these slotted recesses 31, 32 of the holding element 8, of which each two slotted recesses 19, 31 and 20, 32 are to be positioned one over another in pairs. Therefore, with a looped cable tie band (advisably of the recesses 19, 31 and 20, 32 positioned in pairs), which is pushed into a cable tie lock at the ends, a cable tie attachment of the pressure element 12 may be made above the beam extension 7 or the holding element 8.

In summary, the preceding embodiments relate to a clamp holder 1 for suspension in a circular recess 5 (opening) of a support structure, which is equipped with a U-shaped clamp slider 9, whose leg elements 14", 15"0 are provided on the back of this support structure implemented with a T-shaped profile to clamp around a lower flange element 4. An upper leg element 15" is molded on or locked on at (approximately) a right angle at the end and downward (below) from a pillar 10, which is integrated in the clamp holder body profile, a beam extension 7 being molded onto the remaining other end of the pillar 10, which is angled slanted toward the front of the clamp holder 1. A holding element 8 is extended from this beam extension 7, which is parallel to the upper leg element 15". The clamp holder 1 is further supplemented by a support element 81, which is angled at an acute angle downward to the clamp slider 9. With this clamp holder construction, the possibility exists of guiding the flatly designed front of the pillar 10 to the back of a flat web element 3 until the body surfaces contact, the holding element 8, together with the support element 81, also being guided through the recess 5 of the support structure, which is implemented for reasons of structure reinforcement in this region as surrounded by a structure-reinforcing coating or simply flanged around the edge of the (circular, for example) opening, and the clamp slider 9 is pushed onto the lower flange element 4. This thickening with the structure-reinforcing coating or the flanging is compensated for by a further support surface 7A, positioned below the holding element 8 and also assigned to the beam extension 7, which is positioned below the beam extension 7 and presses against the back of the web element 3 in the region of this thickening, the position and the course of the contact face of this support surface 7A being tailored to this thickening, correlating to the flat contact of the pillar 10 on the web element 3. With this measure, firstly a loose suspension of the clamp holder 1 on the support structure is implemented, which may also be called a "suspended clamp holder" because it is capable of being suspended. The clamp holder 1 is attached by the (at least partial) pushing on of a pressure element 12 onto this support element 81 in the direction of its molding onto the holding element 8. In addition, the possibility exists that the clamp slider 9 (more precisely: the upper leg element 15") is removably attached to the lower end of the pillar 10, so that the clamp holder body may be replaced. If the two leg elements 14", 15" are implemented with different thicknesses, the possibility arises of being able to perform a height compensation of the clamp holder 1 positioned on the flange element 4, which is tailored to the insertion of the support element 8 through the circular recess 5 and/or to the attachment of the clamp holder 1 on the web element 3, but also being able to perform an adaption to the thickness of the flange element 4. In this case, a use of thicker and/or longer leg elements 14", 15" is provided, which may be considered differently in relation to a single leg element 14", 15".

According to the embodiment, this clamp holder 1 (suspended clamp holder) is suspended in the circular recess 5 (opening) of an I-beam, for example, using the holding element 8, which is slanted by approximately 15°. The molded-on clamp slider 9 of this suspended clamp holder is then pushed over the horizontal part of the I-beam, so that the front contact face of the linear support region 10a of the suspended clamp holder presses against this perpendicular face of a web element of the I-beam. In order to prevent tilting of the suspended clamp holder due to a weight load of this cantilever beam 6, the pressure element 12 is pushed onto the support element 81 of the suspended clamp holder, which is slanted by 15°. Therefore, the possibility also exists that, through the movement (the pushing on) of the pressure element 12 onto the support element 81, i.e., from the lowermost position of the pressure element 12 onto the (slanted 15°) support element 81 up to the upper position of the pressure element 12 on the support element 81, a thickness difference of the web element 3 (i.e., of the vertical part) of the I-beam may be compensated for. In order to prevent the pressure element form falling off the support element 81 or detaching due to vibration, corresponding catch faces, such as nubby protrusions 28 (catch nubs), which engage in the slots 26, 27 (catch slots) of the pressure element 12, are attached laterally to the support element 81, which is extended from the holding element 8. In this case, the pressure element 12 will clamp around this support element 81. Two strips 29, 30 implemented with rough surfaces, which each press against a correlating rough surface 81G of the support element 81, are attached to the pressure element 12 through the second receiver region 17 within this chamber 12A as an additional safety. Finally, the cable tie band of this specified cable tie is guided through two slots 19, 20, which are taken out from the first receiver region 16 (in the molded-on part) of the pressure element 12 and through further open slots 31, 32, which are taken out from the holding element 8, and then attached to the support structure, also for safety reasons and to ensure solid contact of the pressure element 12 on the web element 3 of the I-beam. Therefore, the web region 3 (the perpendicular part) of the I-beam is wedged solidly between the suspended clamp holder and the pressure element 12.

What is claimed is:

1. A clamp holder for a support structure, comprising:
    a pillar having an upper end region, a lower end region, a front side and a back side;
    a cantilever beam having an end at the upper end region of the pillar at the back side of the pillar and the beam extending from the end thereof and away from the pillar;
    an attachment part at the lower end region of the pillar at the back side of the pillar, the attachment part being attached on a support structure for the clamp holder;
    a beam extension extending from the front side of the pillar from the cantilever beam, the beam extension having a free end;
    a beam-like holding element extending from the free end of the beam extension at a position along the pillar approximately corresponding to that of the cantilever beam; the holding element having a free end, a support element at the free end of the holding element at the front side of the pillar and the support element is extendable through the support structure for the clamp holder;
    a pressure element removably attachable to the support element of the holding element, the pressure element having a base face and a cover face and a first receiver for receiving the support element, the first receiver having a chamber with a space therein defined by an internal wall, and the chamber is open to the cover face of the pressure element, the first receiver chamber and the support element being respectively so shaped in their respective cross sections that when the support element is guided through the chamber, the support element is engaged with the internal wall of the chamber for fixing the pressure element on the support element.

2. The clamp holder of claim 1, wherein the attachment part comprises a clamp slider clamped on a web element of the support structure.

3. The clamp holder of claim 2, wherein the clamp slider comprises an upper leg and a lower leg which are spaced apart so as to slidingly receive between them the web element of the support structure for the clamp holder.

4. The clamp holder of claim 3, wherein the slider is a U-shaped structure including the upper and lower spaced apart legs pinned by a web of the u-shape.

5. The clamp holder of claim 1, wherein the beam extension is angled upwardly from the front side of the pillar and with respect to the cantilever beam.

6. The clamp holder of claim 1, wherein the chamber in the first receiver is open to the base face of the pressure element.

7. The clamp holder of claim 6, wherein the base face is at the bottom of the pressure element and the cover face is opposite the base face.

8. The clamp holder of claim 1, wherein the support element is cuboid in shape, having cuboid long edges and including a cuboid transverse upper surface of the holding element at the front of the pillar and angled upward from the support element.

9. The clamp holder of claim 1, wherein the pressure element includes a second receiver for receiving a cable tie.

10. In combination, the clamp holder of claim 2, and a support structure having the web element which is received in the slider and also having a main web with a front and a back side;
    the pillar being shaped such that the back side thereof is pressed against the front side of the main web;
    the main web having an opening therethrough through which the beam extension projects; the support element being positioned at the beam extension such that the support element is on the back side of the main web when the back side of the pillar is against the front side of the main web, and the pressure element is disposed on the support element at the back side of the main web.

11. The clamp holder of claim 1, wherein the pressure element has a flat, rear lateral face, which contacts a vertical portion of the support structure; the pressure element also includes two slotted recesses, which are each beveled outward from the cover face to the base face of the pressure element rear.

12. The clamp holder of claim 11, wherein the pressure element is open at a front lateral face thereof, defining an opening of the front lateral face and extending from the base face to the cover face, so that the chamber is open on the front of the pressure element.

13. The clamp holder of claim 1, further comprising protrusions on cuboid long faces of the cuboid support element, shaped to a slot width of slots, positioned at approximately half the cuboid height parallel to the cuboid long edges at a distance to one another, the distance of these protrusions being for engaging of the individual protrusions in respective ones of the slots.

14. The clamp holder of claim 1, further comprising multiple strips positioned on the rear of the chamber on an internal chamber wall region, and the strips are guided up to the base face and the cover face of the pressure element and are positioned at a distance from one another, and making an unattached strip surface facing toward the chamber cross-section which is rough or ripped.

15. The clamp holder of claim 1, wherein the base face of the support element is implemented with multiple, parallel, roughened or rippled flat strips or strip-like flat regions, which run along or parallel to the cuboid long edges and are positioned at a distance to one another.

16. The clamp holder of claim 14, wherein the base face of the support element is implemented with multiple, parallel, roughened or rippled flat strips or strip-like flat regions, which run along or parallel to the cuboid long edges and are positioned at a distance to one another;
  wherein the roughened or rippled strip surfaces of the pressure element and of the flat strips or the strip-like flat regions of the support element are mechanically correlated with one another if the support element is guided through the chamber or the pressure element is pushed onto the support element such that the flat strips or the strip-like flat regions are positioned on the strip surfaces for enabling at least one strip or a detachable fastening of both elements.

17. The clamp holder of claim 1, further comprising an element section near a free end of the holding element having two further slotted recesses, which are received by slotted recesses of the pressure element such that a cable tie may be guided through those slotted recesses which are positioned in pairs one over another.

* * * * *